March 29, 1966     W. W. SMITH     3,242,826
LOCKING DEVICE FOR A FLUID OPERATED ROD
Filed Oct. 11, 1963     2 Sheets-Sheet 1
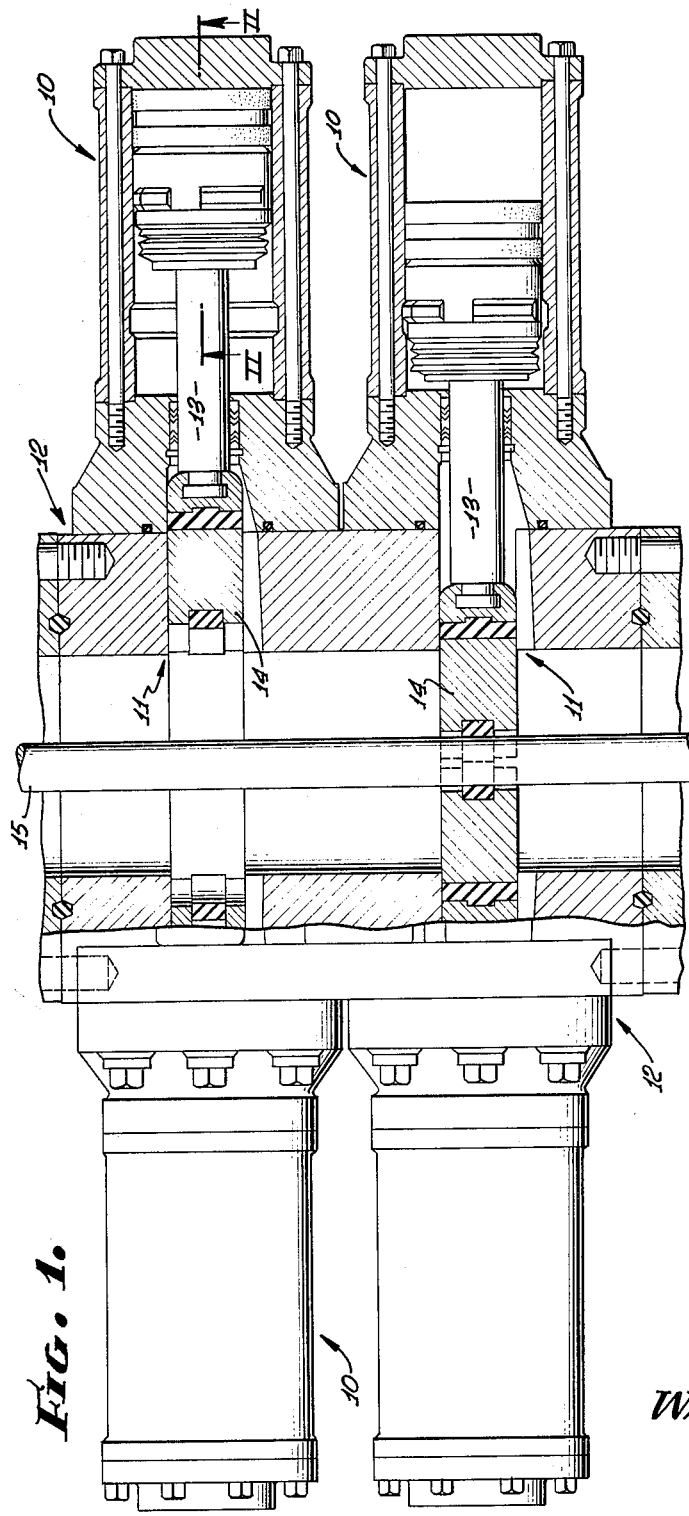
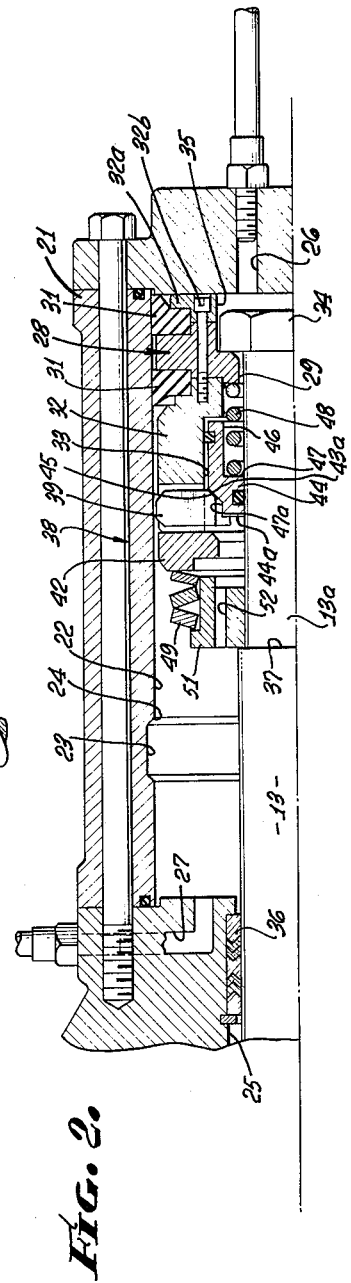
INVENTOR.
WARREN W. SMITH
BY
Miketta & Glenny
ATTORNEYS.

March 29, 1966 W. W. SMITH 3,242,826
LOCKING DEVICE FOR A FLUID OPERATED ROD
Filed Oct. 11, 1963 2 Sheets-Sheet 2
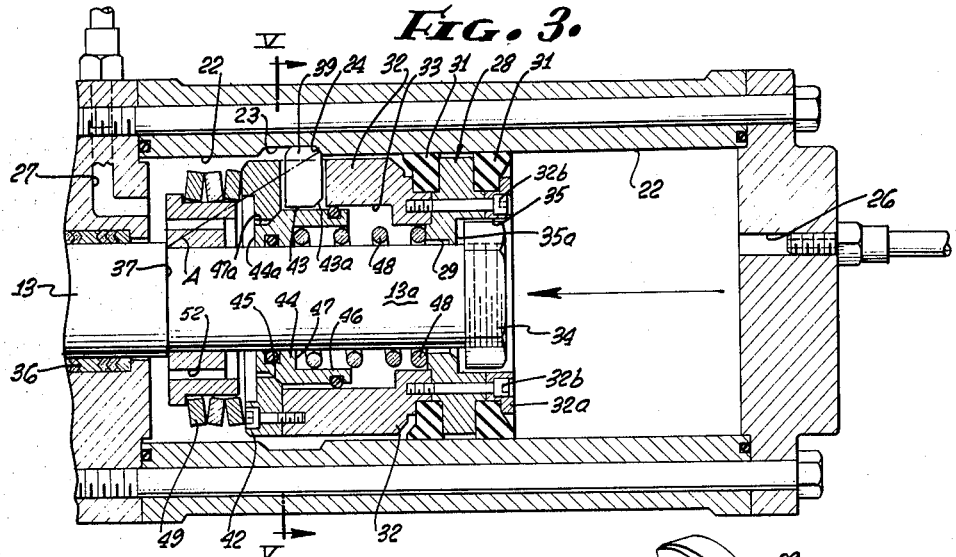
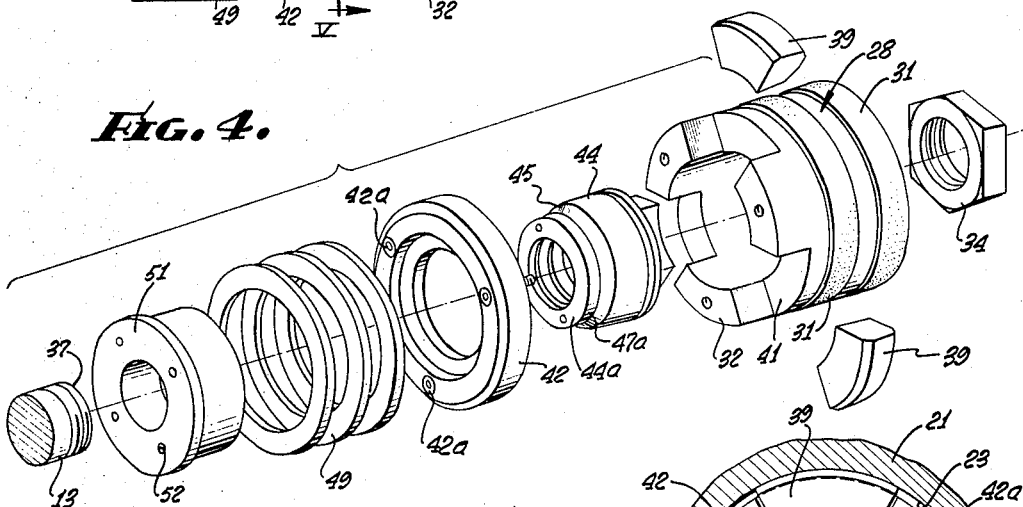
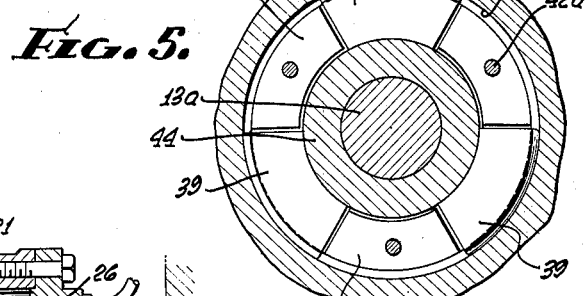
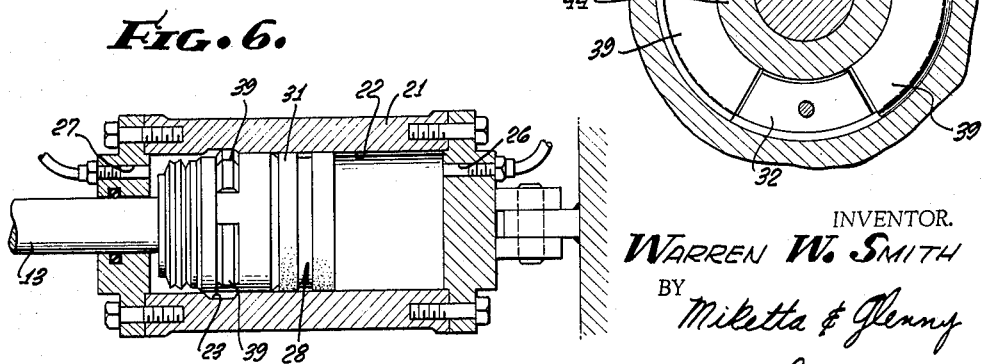
INVENTOR.
WARREN W. SMITH
BY Miketta & Glenny
ATTORNEY

United States Patent Office 3,242,826
Patented Mar. 29, 1966

3,242,826
LOCKING DEVICE FOR A FLUID
OPERATED ROD
Warren W. Smith, Garden Grove, Calif., assignor to Shaffer Tool Works, Brea, Calif., a corporation of California
Filed Oct. 11, 1963, Ser. No. 315,527
5 Claims. (Cl. 92—24)

The present invention relates to a locking device for a fluid operated rod and more particularly to a locking device which automatically locks a fluid operated rod when the rod is moved into a working or locked position, wherein the locking device is actuated in response to the movement of the rod.

Heretofore, locking devices used on fluid operated pistons or rods such as are used in oil well blow-out preventers, aircraft landing apparatus and other fluid operated presses or lifts have been hampered by deficiencies which decrease their desirability in certain situations. Where a fluid operated rod is to be maintained in a working position for any length of time, it is desirable to have a locking device which locks the rod in that position. Due to the frequent inaccessibility of the unit, as when an aircraft is in flight, manually operated locking devices are many times inconvenient and impractical. As a further example, when fluid actuated rods are used to operate a ram-type blow-out preventer or control gate in a sub-sea oil well drilling rig, to lock the rod in the working position manually would require a deep sea diver submerging to the preventer to actuate the lock. An alternative to a manually operated lock would be to maintain the fluid pressure on the rod throughout the period of operation. Both prior methods of retaining a rod in the working position can become very costly and time consuming.

The device of the present invention operates automatically when the rod is moved into the working position. Briefly, the device of the present invention has an expandable locking ring or segments of a ring which expands into engagement with an annular recess provided in a cylinder wall. The locking ring or segments moves with the rod and is adapted to be expanded by a conical member which moves in response to the rod movement.

Accordingly, it is a general object of the present invention to provide a locking device that avoids all of the foregoing disadvantages of locking apparatus used heretofore on fluid operated rods.

An object of the present invention is to disclose and provide a locking device for use on a fluid operated rod to automatically lock the rod when it is moved into a predetermined position.

Another object of the present invention is to disclose and provide an automatic locking device which creates a strong, positive lock on a rod so that the fluid operating the rod may be relieved while the rod is in the locked position.

Still another object of the present invention is to disclose and provide a locking device, for use on a fluid operated rod, which can be remotely controlled.

Yet another object of the present invention is to disclose and provide a locking device that is constructed so as to utilize to the best advantages the forces and reactions which are produced between mating surfaces of the locking elements to produce a positive and non-failing locking device.

Other objects and many of the attendant advantages of this invention will be readily appreciated as the same becomes better understood by reference to the following detailed description when considered in connection with the accompanying drawings wherein:

FIG. 1 shows a side elevation, partly in section, of an exemplary locking device of the present invention as used with an oil well hydraulic gate which is one of many possible devices with which the present invention may be utilized.

FIG. 2 shows the device of the present invention in longitudinal section taken along plane II—II of FIG. 1.

FIG. 3 is a side elevation, partly in section, of the device of the present invention with the working rod in locked or working position.

FIG. 4 is an exploded isometric view of the device of the present invention.

FIG. 5 is a transverse section of the device taken along plane V—V of FIG. 3.

FIG. 6 illustrates a side elevation, partly in section of a modified form of the device as it might be used in some other environment.

Referring now to the drawings, wherein like reference characters designate like or corresponding parts throughout the several views, there is shown in FIG. 1 the locking device 10 of the present invention as it may be used to lock a ram 11 of a hydraulic gate 12 in the closed hole position. It should be understood that the device of the present invention has many uses other than on hydraulic gates and that the device can be used to lock any type shaft or rod 13 that is fluid operated in a telescoping manner. When used in a hydraulic gate 12, rod 13 may be interconnected to a ram block 14 which may be used to completely close off an empty well hole, or it may pack off around a drill string 15 in the well hole. It is understood that rod 13 may be connected to an aircraft landing gear (not shown), an automobile hydraulic lift (not shown) or any other mechanism where a fluid operated rod may be telescoped into a working position as best illustrated by the compact unit in FIG. 6.

As best seen in FIGS. 2 and 3, the locking device 10 of the present invention has a housing 21 including an inner cylindrical bore or working cylinder 22. An annular recess 23 including a stop shoulder 24 may be provided in working cylinder 22 and may be near one end of working cylinder 22. Housing 21 may also be provided with an axially aligned port 25 at one end of working cylinder 22 for slidably receiving rod 13.

Means may be provided for selectively supplying fluid pressure to end portions of the cylinder 22. Such means may include fluid ports 26 and 27 which are adapted to be connected to remotely operable pressurized fluid sources (not shown).

Slidingly received and movable within the cylinder 22 may be piston means or working piston 28 which has an axial through bore 29. Piston 28 may be provided with piston rubbers or seals 31 to provide a pressure responsive piston. Piston rubbers or seals 31 may be of any resilient material such as synthetic rubber, natural rubber, fibre or the like, but are preferably Hycar-Buna having a Shore hardness of between 80–90. Piston 28 also includes a longitudinally extending annular flange portion 32 and an annular retainer portion 32a, these portions being secured together by a plurality of cap screws 32b. As shown in FIG. 3, the flange 32 has an inner bore or cavity 33 of greater diameter than bore 29.

Associated with piston 28 may be an elongated, axially extending piston rod or working shaft 13. Piston rod 13 may be slidably received by bore 29 of piston 28 and threaded at its end to receive a lock nut 34, this nut being located within a recess 35 and capable of bearing against an annular surface 35a of the piston 28 for retaining purposes. The end 13a of rod 13 that is associated with piston 28 is of slightly reduced diameter from the remaining portion of rod 13. This reduced diameter creates a longitudinally directed shoulder 37 at the transition point.

Rod 13 is movable axially between a locked position as best seen in FIG. 3 and an unlocked position as best seen in FIG. 2. In both the locked and unlocked positions, rod 13 extends out of cylinder 22 through port 25. Sealing means 36 may be provided in port 25 to cooperate with rod 13 to seal off port 25 around rod 13.

When fluid pressure is admitted through fluid port 26 as best seen in FIG. 2, piston 28 and rod 13 are adapted to move in a working stroke toward the locked position (FIG. 3) which is at the end of the working stroke.

Locking means 38 may be provided within housing 21 and operatively associated with piston 28 to cooperably engage or register with annular recess 23 in cylinder 22 for locking rod 13 in response to piston 28 being moved. Such locking means may include segmented locking elements or ring 39 provided adjacent the end of piston 28 and slidingly fitting into similarly shaped cavities 41 formed in flange 32 of piston 28 as best seen in FIG. 4. Such locking elements 39 may be formed of any suitable material, such as a malleable material, with aluminum bronze alloy being satisfactory.

Locking elements 39 are restrained from radial movement by cylinder wall 22 and from longitudinal movement by retaining ring 42 which is attached to piston flange 32 by means of bolts 42a. As best seen in FIG. 3, each locking element 39 is provided with an inner bore or surface 43. This bore 43 has at least a portion 43a which is frusto-conical in shape.

Energizing means may be provided adjacent locking elements 39 to radially expand locking elements 39 into registration with annular recess 23 and stop shoulder 24 when rod 13 reaches the end of its working stroke (FIG. 3). Such energizing means may include a locking cone member 44 slidingly disposed on rod 13 within cavity 33 of piston 28. Such locking cone may have a frusto-conical or tapered outer surface 45 and a longitudinally extending annular flange 46 which includes a transverse bearing surface 47.

In the unlocked position as best seen in FIG. 2, locking cone 44 abuts piston 28 in cavity 33 due to the inward pressure of elements 39 which are urged inwardly by the cylinder bore 22. In this position the elements 39 rest on a shoulder 47a of the locking cone 44.

Spring 48 is provided within locking cone 44 to continuously bias and impart longitudinal movement to locking cone 44 when locking elements 39 are free to expand radially. Spring 48 is adapted to bear against one end of piston 28 and at the other end against bearing surface 47.

Locking cone 44 is thus adapted to be moved axially, by spring 48, bringing into engagement frusto-conical outer surface 45 of locking cone 44 with the frusto-conical inner surface 43a of locking elements 39 (FIG. 2). Further movement of the locking cone 44 will force surfaces 43a and 45 to slide relative to each other and thereby radially expanding locking elements 39. As locking elements 39 are normally restrained from radial movement by cylinder walls 22, they will only expand when operably positioned with respect to the annular recess 23 in the cylinder walls 22.

A set of Belleville springs 49 may be provided longitudinally adjacent retaining ring 42 and which are held in place by a spring retaining bushing 51. Springs 49 when deflected serve to retain rod 13 in an energized position once the piston assembly has been moved into the locking position and to compensate for dimensional variation in replacement parts, as well as the wearing of sealing elements included in the ram block 14 (FIG. 1). Bushing 51 is positioned and retained on rod 13 by abutting shoulder 37. As the sealing elements in the ram block 14 wear, the spring means 49 urges the bushing 51 against the shoulder 37 thereby forcing the rod 13 inwardly to compensate for the wear on the sealing elements. This could not be accomplished if the bushing 51 and ring 42 were solid. The entire locking assembly 38 is then held in place by bushing 51 and lock nut 34. Bushing 51 also has a series of circumferentially spaced longitudinally extending ports 52 communicating the cylinder bore 22 with the piston bore 29.

To remotely operate the locking device 10 of the present invention, fluid pressure is first introduced into one end of working cylinder 22 through fluid port 26 as best seen in FIG. 2. At this point, the rod 13 is in the non-working or unlocked position. As fluid pressure in the cylinder 22 increases, piston 28 is moved axially toward the working position (FIG. 3). Rod 13 is thereby moved or telescoped out of cylinder 22 through sealed port 25. Spring 48 is in a compressed condition continuously urging the cone 44 into engagement with locking elements 39 which are only retained by cylinder wall 22. The Belleville spring 49 is uncompressed at this stage.

As the piston 28 and rod 13 move toward the locking position, Belleville spring 49 is slightly compressed, maintaining the piston 28 and rod 13 in close association. When the device is moved into the locking position (FIG. 3), the locking elements 39 automatically expand and move radially into recess 23 as a result of the bias and urging of spring 48. Further insertion of locking cone 44 into locking elements 39 results in a conical wedging action forcing the segmented locking elements 39 to expand radially into recess 23.

After the segmented locking elements 39 are locked in and registered with recess 23, the locking elements will engage stop shoulder 24 to prevent longitudinal rearward movement thereof. The full insertion of locking cone 44 into locking elements 39 prevents any radial contraction of the locking elements 39.

The fluid pressure can then be released, if desired, and rod 13 will remain mechanically locked in the working position. Any tendency for longitudinal movement of the rod 13 toward the unlocked position will be imparted to locking assembly 38 through bushing 51 at shoulder 37. As indicated in FIG. 3 this movement is resisted by a reaction or force acting along phantom line A (FIG. 3). Therefore, a direct, positive and reliable lock holds the fluid operated rod 13 in the working position.

To release the locking device 10 of the present invention, fluid pressure may be introduced into the opposite end of cylinder 22 through fluid port 27. As the pressurized fluid increases within cylinder bore 22, it passes through ports 52 in bushing 51 and acts against the end 44a of locking cone 44. This pressurized fluid compresses spring 48 and forces locking cone 44 into a retracted position, thereby allowing locking elements 39 to cam off stop shoulder 24 and radially contract. After locking elements 39 are fully contracted within cavities 41 of piston 28, rod 13 and piston 28 are moved back to the unlocked position (FIG. 2).

It can be readily understood from the above detailed description that the locking device of the present invention has many advantages over prior locking arrangements or apparatus. The locking device of the present invention can be easily and quickly remotely controlled to facilitate efficient manipulation of the working rod. The locking assembly operates automatically after the rod has been moved to the working position. Moreover, the pressurized fluid can be withdrawn after the rod is locked into position, thus relieving stress and strain on seals in the event the rod remains locked for long periods of time.

Obviously, many modifications and variations of the present invention are possible in the light of the above teachings. It is therefore to be understood that within the scope of the appended claims the invention may be practiced otherwise than as specifically described.

I claim:
1. In a pressure fluid operated device including a working cylinder, a working piston movable in said cylinder, a piston rod associated with said piston and extending from the cylinder and means for supplying pressure fluid to end portions of said cylinder, the provision of means for mechanically releasably locking said piston rod and piston at the end of a working stroke without reliance upon maintenance of pressure fluid in said cylinder, comprising:
   an annular recess formed in the cylinder, said recess including a stop shoulder;
   segmented locking elements carried by the piston rod, and radially expandable into operative engagement with said stop shoulder, said locking elements having a frusto-conical inner bore;
   a locking cone carried by the piston rod adjacent the piston and cooperable with said frusto-conical inner bore to radially expand said locking elements into engagement with said stop shoulder for releasably locking said piston rod at the end of its working stroke;
   spring means adjacent said locking cone to bias said locking cone into operable engagement with said locking elements; and
   a second spring means operating on said piston and said rod for biasing the piston and the rod relative to each other when said locking elements are in engagement with said stop shoulder.

2. In a pressure fluid operated device including a working cylinder, a working piston movable in said cylinder, a piston rod associated with said piston and extending from the cylinder and means for supplying pressure fluid to end portions of said cylinder, the provision of means for mechanically releasably locking said piston rod and piston at the end of a working stroke without reliance upon maintenance of pressure fluid in said cylinder, comprising:
   an annular recess formed in the cylinder, said recess including a stop shoulder;
   locking means carried by the piston rod and expandable into operative engagement with said stop shoulder for releasably locking said piston rod at the end of its working stroke;
   spring means for biasing said locking means into operative engagement with said stop shoulder;
   a second spring means operating on said piston and said rod for biasing the piston and rod relative to each other when said locking means is in engagement with said stop shoulder.

3. In a pressure fluid operated device including a working cylinder, a piston rod associated with said piston and extending from the cylinder and means for supplying pressure fluid to end portions of said cylinder, the provision of means for mechanically releasably locking said piston rod and piston at the end of a working stroke without reliance upon the maintenance of pressure fluid in said cylinder, comprising:
   an annular recess formed in the cylinder,
   a locking element carried by the piston rod and radially expandable into operative engagement with said annular recess, said locking element having an inner bore;
   a locking cone carried by the piston rod adjacent the piston and cooperable with said inner bore of said locking element to radially expand said locking element to radially expand said locking element into engagement with said annular recess for releasably locking said piston rod at the end of its working structure;
   spring means adjacent said locking cone to bias said locking cone into operable engagement with said locking element; and
   a second spring means operating on said piston and said rod for biasing the piston and the rod relative to each other when said locking element is in engagement with said annular recess.

4. A remotely controlled, fluid operated locking device, comprising:
   a housing having an inner cylindrical bore including an annular recess in said bore;
   means for supplying fluid pressure to end portions of said bore;
   an elongated, axially extending rod adapted to be moved within said bore between locked and unlocked positions;
   a piston means connected to one end of said rod and slidably received in said bore;
   locking means within said housing and operably associated with said piston means to cooperatively associate with said annular recess in said bore for locking said rod in locked position in response to said piston means being moved;
   spring means for biasing said locking means into said annular recess in said bore; and
   second spring means operating on said piston and said rod for biasing the piston and rod relative to each other when said locking means is in engagement with said annular recess in said bore.

5. A remotely controlled, fluid operated locking device, comprising:
   a housing having an inner cylindrical bore including an annular recess in said bore;
   means for supplying fluid pressure to end portions of said bore;
   an elongated, axially extending rod adapted to be moved within said bore between locked and unlocked positions;
   a piston means connected to one end of said rod and slidably received in said bore;
   locking means within said housing and operably associated with said piston means to cooperatively associate with said annular recess in said bore for locking said rod in locked position in response to said piston means being moved; and
   spring means for biasing said locking means into said annular recess in said bore and for biasing the piston and rod relative to each other when said locking means is in engagement with said annular recess in said bore.

References Cited by the Examiner

UNITED STATES PATENTS

| | | | |
|---|---|---|---|
| 3,008,454 | 10/1961 | Wilkins | 92—24 |
| 3,020,888 | 2/1962 | Braun | 92—84 |
| 3,072,105 | 1/1963 | Johnson | 92—84 |
| 3,107,582 | 10/1963 | Royster | 92—24 |
| 3,108,513 | 10/1963 | Koshobu | 92—24 |

SAMUEL LEVINE, *Primary Examiner.*

RICHARD B. WILKINSON, *Examiner.*